United States Patent [19]

Hart et al.

[11] 4,244,325
[45] Jan. 13, 1981

[54] DISPOSAL OF OXIDES OF NITROGEN AND HEAT RECOVERY IN A SINGLE SELF-CONTAINED STRUCTURE

[75] Inventors: Wallace F. Hart; David O. Watts; Robert D. Reed, all of Tulsa, Okla.

[73] Assignee: John Zink Company, Tulsa, Okla.

[21] Appl. No.: 16,294

[22] Filed: Mar. 1, 1979

[51] Int. Cl.³ ............................................ C01B 21/20
[52] U.S. Cl. ................................... 122/4 R; 423/235
[58] Field of Search ................. 122/4 R, 20 B, 136 R, 122/137, 140 R, 141, 149, 174, 468, 4 D; 431/10; 423/235; 422/183, 198

[56] References Cited

U.S. PATENT DOCUMENTS

| 2,673,141 | 3/1954 | Barman | 423/235 |
| 3,232,713 | 2/1966 | Felder | 422/183 |
| 3,612,001 | 10/1971 | Gossalter | 122/136 R |
| 3,776,199 | 12/1973 | Miller | 122/136 R |
| 3,816,595 | 6/1974 | Lahaye et al. | 122/4 D |
| 3,873,671 | 3/1975 | Reed et al. | 423/235 |
| 3,911,083 | 10/1975 | Reed et al. | 423/235 |
| 4,050,877 | 9/1977 | Craig et al. | 431/10 |

Primary Examiner—Anthony V. Ciarlante
Attorney, Agent, or Firm—Head & Johnson

[57] ABSTRACT

A self-contained single structure for NOX disposal and heat recovery, comprising a burner means (12), including means to supply NOX (oxides of nitrogen) gases (146) to be reduced, primary air (130) in less-than-stoichiometric flow rate, and gaseous fuel (128) at selected flow rate. The gases flow into a first reducing section (114), in which the fuel is burned in a reducing atmosphere, and the NOX gases are reduced. Fire tubes (124) carrying water or steam are positioned to receive heat from the burning gases. At the outlet of the reducing section precooled stack gases (135) are injected (137) into the flame so as to cool the hot products of combustion. The direction of flow of hot gases is turned to 90° (164) in a second section. At the end of the second section the direction of flow is turned 90° so as to be counter to the first direction in a third or oxidizing section (182) to which secondary air is added (172) and a fourth or boiler section (124) accepts the hot gases from the oxidizing section to recover the waste heat.

12 Claims, 5 Drawing Figures

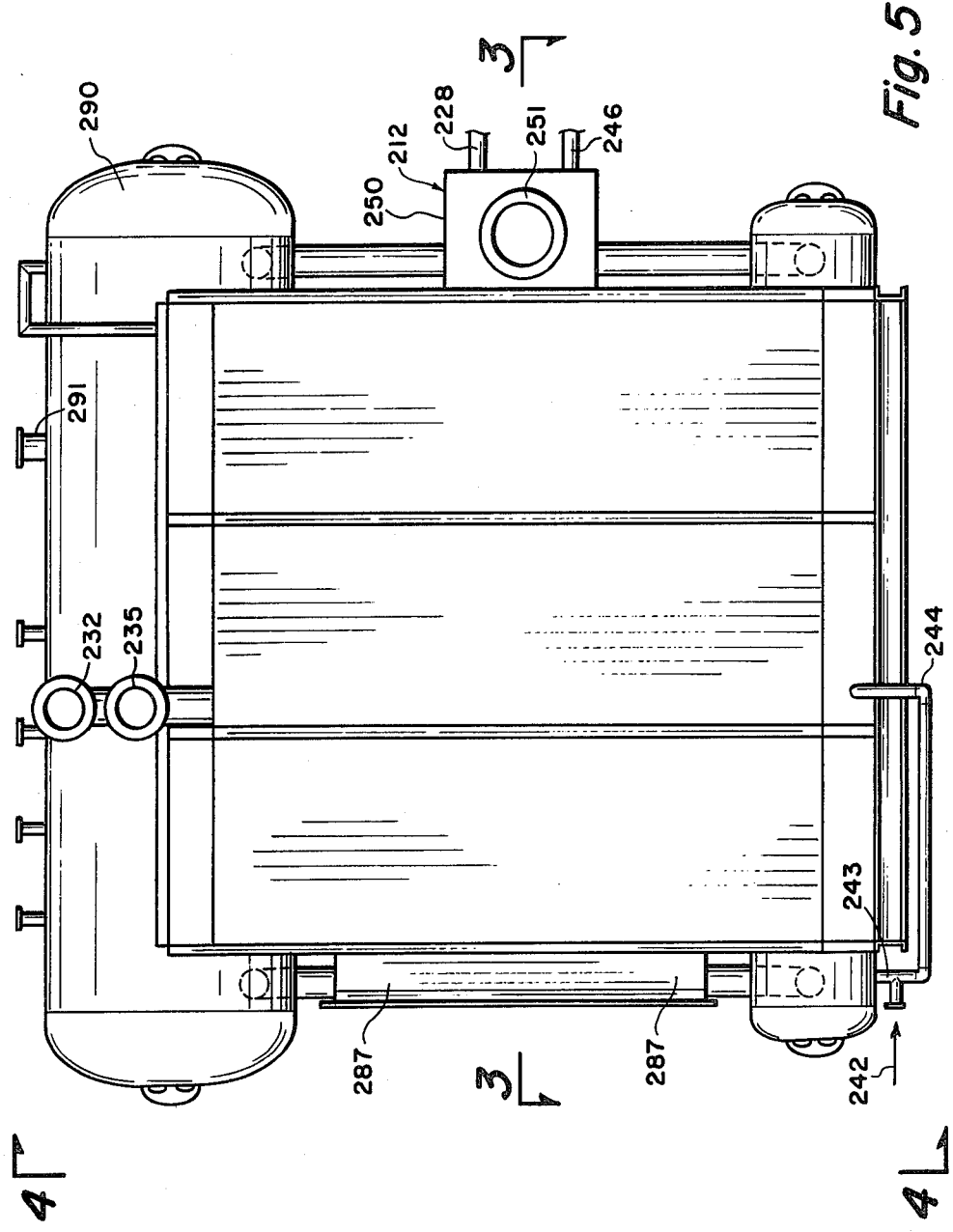

DISPOSAL OF OXIDES OF NITROGEN AND HEAT RECOVERY IN A SINGLE SELF-CONTAINED STRUCTURE

BACKGROUND OF THE INVENTION

This invention lies in the field of NOX reduction. More particularly, it concerns a self-contained single structure in which gases which contain oxides of nitrogen (referred to herein as "NOX"). are reduced by the burning of fuel under selected conditions, and including heat recovery means, all within the single enclosure.

In the prior art, apparatus has been shown, in which NOX gases are reduced in a somewhat similar chemical procedure but in entirely separate and isolated structures. Any heat recovery from such a structure has been in the form of a separate boiler structure for heat recovery. In view of the great interest at the present time in removal of nitrogen oxides from effluent gases, it is important to provide a simplified unitary structure of compact construction and efficient operation.

Advantages of this type of structure are multiple. First of all, there is a reduction in cost due to elimination of outer walls of separate structures, and there is reduced volume which requires less floor space in the overall operation. Also, means are conveniently provided for recovering high temperature heat in the furnace section, as well as low temperature heat in the heat recovery section, with internal connections whenever possible.

SUMMARY OF THE INVENTION

It is the primary object of this invention to provide a unitary compact structure in which fuel can be burned for the reduction of NOX gases, and complete high-temperature and low-temperature heat recovery can be accomplished in the same structure.

These and other objects are realized and the limitations of the prior art are overcome in this invention by breaking up the total longitudinal flow of gases into shorter sections so that the successive sections can be changed in direction so that common walls can be provided between two sections and a smaller overall volume required for the total structure.

In one embodiment fuel, NOX gases and primary air are passed through a burner into a reducing section, in which heat is extracted by a fire tube boiler, which is in the form of an annular volume surrounding the cylindrical furnace reducing section. The flame and hot gases pass downstream into a second section into which cooled stack gases are injected so as to reduce the temperature of the hot gases while in a reducing atmosphere, to reduce the probability of reoxidizing the nitrogen. The flow of cooled gases is then directed in the opposite direction, through an annular passage which forms a third section, into which secondary air is also injected, to provide a reoxidation section, in which complete combustion of the partially-burned fuel is accomplished, but at a lower flame temperature. The effluent from the reoxidation section then passes through fire tubes of the boiler, which surrounds the reduction section. Thereafter, the cooled products of combustion are conducted to a stack in a conventional manner.

This type of construction reduces the overall length of the structure to approximately one half, with only a nominal increase in diameter, thereby providing for a more convenient shape and size for a combination NOX disposal and waste heat recovery system. In another and preferred embodiment, the four operating sections, namely the furnace or reducing section, the cooling section, the reoxidation section and the waste heat recovery section are arranged in three adjacent parallel zones, with two complete reversals from the first direction of the entering NOX gases, fuel, and air, which pass into the reducing section. In the second section the cooled stack gases are introduced and mixed with the hot products of combustion from the first section. At the same time the direction of flow of gases is reversed. After injection of the secondary air the gases pass into a reoxidation zone, where the final combustion of all combustible material takes place. On the output of the reoxidation section the gases are again reversed in direction into their original, first direction, as they pass into the heat recovery section, after which the cooled products of combustion flow to the stack.

BRIEF DESCRIPTION OF THE DRAWINGS

These and other objects and advantages of the invention and a better understanding of the principles and details of the invention will be evident from the following description taken in conjunction with the appended drawings in which:

FIGS. 3, 4 and 5 illustrate separate views of a preferred embodiment of the invention.

DESCRIPTION OF THE PREFERRED EMBODIMENTS

Figure 1:
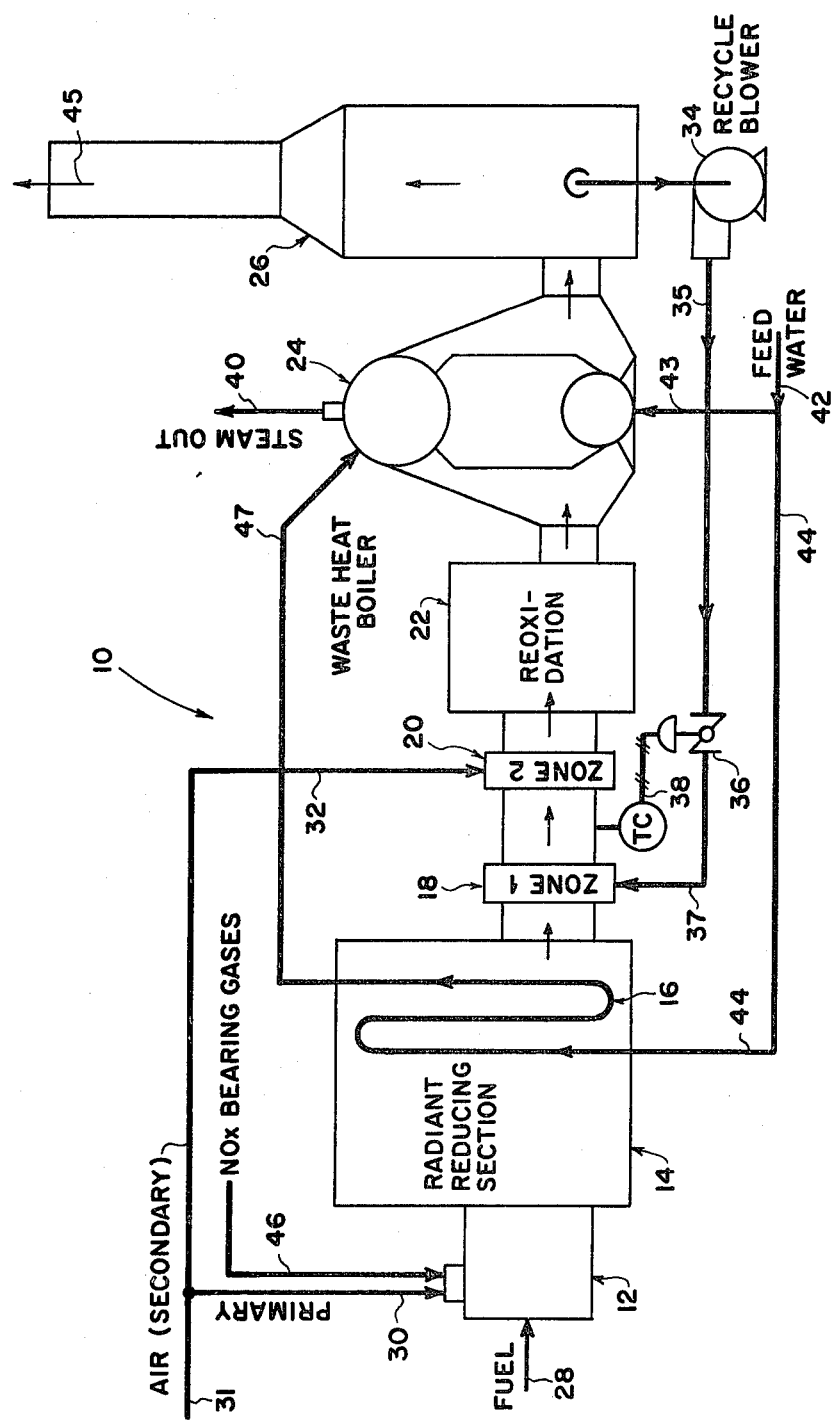
FIG. 1 represents the prior art construction.

Referring now to the drawings and, in particular, to FIG. 1, there is shown a conventional construction of a system for reduction of NOX gases. These are in separate structures and include a separate waste-heat boiler and finally the stack.

The overall structure is indicated generally by the numeral 10. The burner is indicated generally by the numeral 12. The radiant reducing section is indicated generally by the numeral 14, with the heat recovery from the radiant section indicated generally by the numeral 16.

At the output of the radiant section, the hot gases are cooled in a first zone 18 by injection of cooled stack gases. Thereafter additional combustion air, namely secondary air, is injected to reoxidize in a reoxidation section for the purpose of completing the combustion of all combustible materials. The heat produced by combustion in the reoxidation section 22 is then recovered in a waste heat boiler indicated generally by the numeral 24, of conventional design. Thereafter the cooled products of combustion go to a stack indicated generally by the numeral 26.

All of the various sections of the system are connected in series and the gas flow is in a single direction. At the start, fuel 28 is injected along with primary air 30 and NOX bearing gases 46 to be reduced.

The amount of primary air is approximately 80% of the total air supply so as to provide less-than-stoichiometric quantity of air. This provides a reducing atmosphere in section 14, and oxygen is given up by the nitrogen oxides for burning the fuel. In the presence of high temperature gases the nitrogen would tend to reoxidize but, in view of the lack of oxygen, there is no recombination and the hot gases are then cooled by the injection of cooled stack gases. This reduces the temperature of the combustion gases from a high temperature in the region of 2,000° F. to a more moderate temperature of 1,200° F. At the lower temperature there is only limited tendency for the nitrogen to reoxidize. The recycled stack gases are taken to a recycle blower 34 and by conduit 35 through a control valve 36 and line 37 are injected into the flow of hot gases from the radiant reducing section 14. The rate of flow of cooling gases is controlled by the valve 36, which is under control of termocouples 38 sensitive to the temperature of the cooled gases.

The secondary air is then introduced through conduit 32 at the second zone 20, and all of the remaining combustibles, such as carbon, carbon monoxide, hydrogen, formaldehyde, or others, that might be present, are burned in the reoxidation section 22. This again raises the temperature so that it becomes economical to recover the waste heat in the effluent gases. This is done by means of the waste heat boiler 24, which produces steam output by line 40. Incidentally, feed water is supplied by line 42, and goes through line 44 to the radiant heat recovery in the reducing section, and the steam output goes by line 47 to the waste heat boiler 24. Feed water also goes by line 43 into the waste heat boiler. The outflow from the waste heat boiler is now in the neighborhood of 300° and passes up the stack 26 in accordance with arrow 45.

Figure 2:
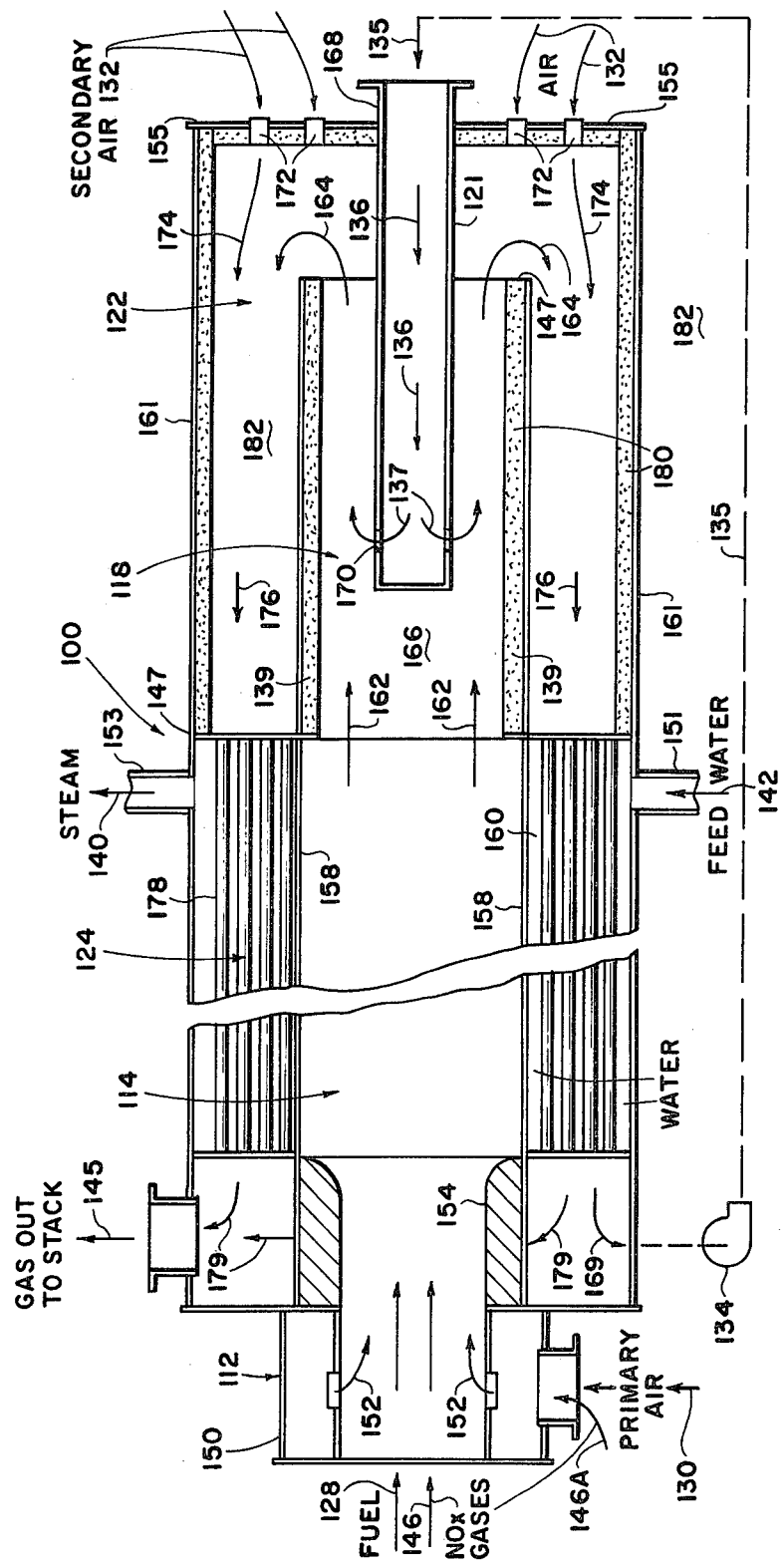
FIG. 2 represents one embodiment of this invention.

Referring now to FIG. 2, there is shown one embodiment of the invention, which is a system which operates substantially along the lines of the conventional system of FIG. 1 but on a more compact and efficient type of operation.

In FIG. 2 fuel is introduced in accordance with arrow 128. NOX gases are introduced in accordance with arrows 146 and/or 146A with the primary air, which is less-than-stoichiometric, being about 80° of the required air. Primary air flows in accordance with arrow 130 into the burner system and into the combustion space 114, in accordance with arrows 152. The fuel and air entry system is indicated generally by the numeral 112. This flows through a burner tile 154, into a combustion chamber or furnace 114, which is called a reducing zone, inasmuch as it will have a reducing atmosphere. The wall 158 of the reducing section 114 is generally in a circular cylindrical form, and is a separating wall between the furnace space 114 and a fire tube boiler 124. The radiant heat from the flame in the space 114 is transferred through the wall 158 to the water 160 and, thus, provides steam which flows through an outlet conduit 153 in accordance with the arrow 140. Feed water is brought in through an inlet 151 in accordance with arrow 142.

At the position 147, where the reducing section 114 terminates, the hot gases 162 flow into a cooling section 118. This is substantially the same diameter as that of the reducing section 114. However, it will have a wall 139 of heat-resisting material, because, unlike wall 158, it is not in contact with cooling water.

There is an axial tubular conduit 121 through which cooled stack gases are flowed in accordance with arrows 135 and 136. These gases flow out through a series of circumferential ports 170 in accordance with arrows 137 to mix with the hot gases 162, so that their temperature will be reduced to a selected value. The cooled gases 164 continue to flow in the annular zone between the axial tube 121 and the wall 139. There is a transverse end wall 155, which incidentally supports the axial tube 121. The wall 155 is spaced downstream from the end 147 of the wall 139 providing a region in which the flow of gases 164 can be reversed from a first direction of the fuel and air, to a reversed direction, 180° different.

Secondary air illustrated by arrows 132 is injected through ports 172 in the wall 155, in accordance with arrows 174, to mix with the cooled gases 164 so that they will continue to burn utilizing the remaining combustibles in the gases 164. This combustion takes place in the reoxidation zone 122 in the annular space 182 between the wall 139 and the outer wall 161 of the reoxidation zone.

Additional combustion takes place in the annular space 182 so that, by the time the gases reach the position 147 in accordance with arrows 176, all the combustion has been completed. The hot products of combustion then pass through fire tubes 178 in the heat recovery section 124, where they are cooled to a temperature in the region of 300° F. They flow in accordance with arrows 179 and 145 to a conventional stack for emission into the atmosphere.

As shown by arrow 169, part of the cooled combustion gases at the outlet of the fire tubes 178, are carried by dashed line to a recycle blower 134, and delivered in accordance with dashed line 135 to the arrows 135 136, to be injected into the cooling section 118 as previously mentioned.

While the system as shown in FIG. 2 has all of the apparatus shown in FIG. 1, there is a great saving in overall size since it is, in a sense, folded once so that the longitudinal dimension is reduced by about half. Furthermore, there are common walls between certain of the various sections so that, there is less cost and space required, while permitting the transfer of heat through one wall such as 158, as is desired.

Figure 3:
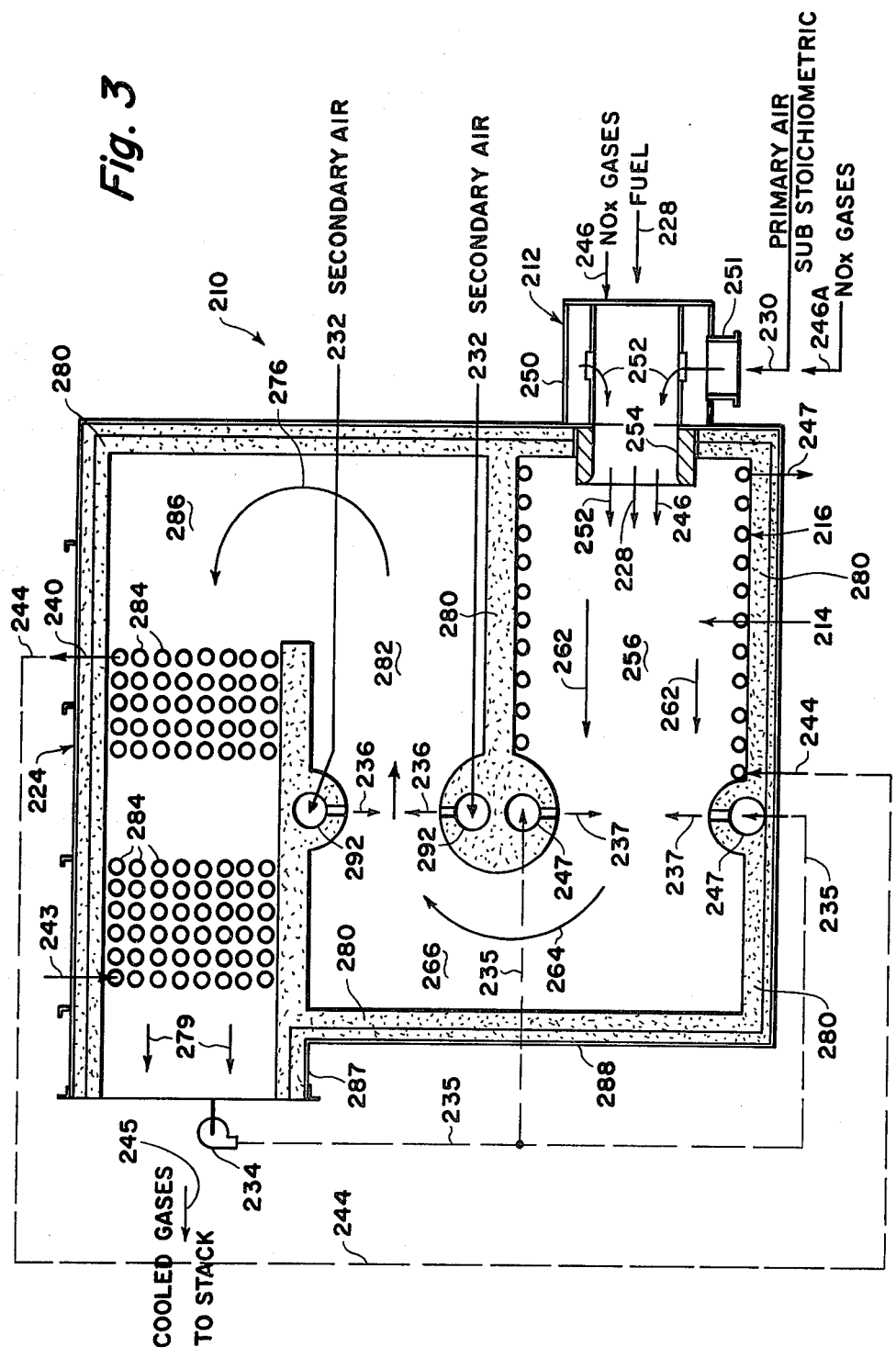
Figure 4:
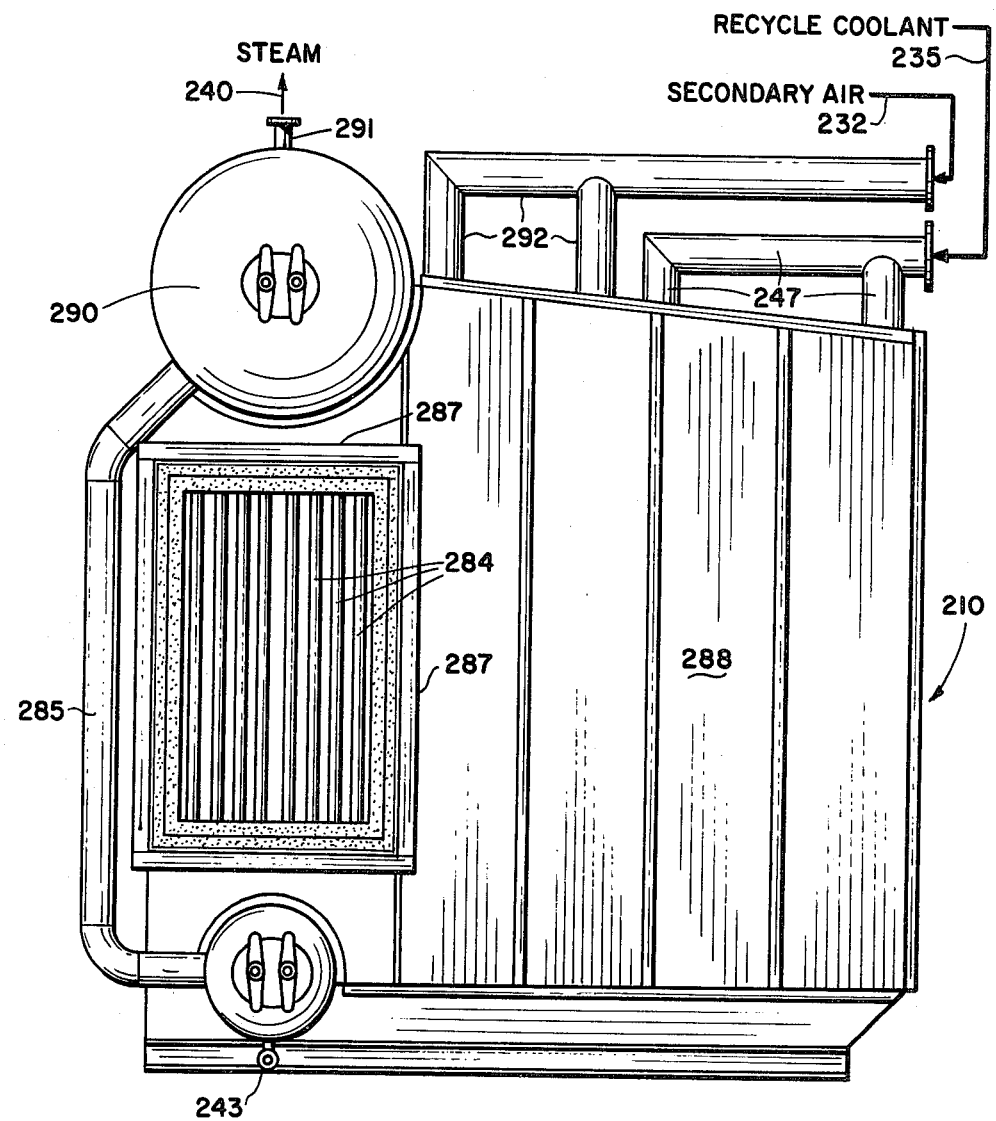

Referring now to FIGS. 3, 4 and 5, three views are shown of a second preferred embodiment of this invention. FIG. 5 shows a side view of the structure. FIG. 4 is an end view of the structure taken across plane 4—4 of FIG. 5. FIG. 3 is a cross-section taken across horizontal plane 3—3 of FIG. 5. FIG. 3 shows more clearly than any of the others the construction and operation of the preferred system of this invention.

As in the case of FIG. 3, there is a burner system indicated generally by the numeral 212, into which is supplied NOX gases in accordance with arrows 246 and 246A. Fuel in selected quantity is supplied in accordance with arrow 228. Primary air is supplied in accordance with arrow 230. The three sets of gases meet and pass through the tile 254 of the burner, into the interior 256 of a furnace section, or reducing section, 214. Here combustion is permitted to take place at high temperature under reducing conditions, which are provided by the fact that the amount of primary air 230 is less-than-stoichiometric, being in the range of 60—80% of total requirements. Under the high temperature and reduced air supply the nitrogen oxides are reduced.

The fuel is burned in accordance with the inflow of arrows 246, 228 and 252, in the space 256, which is lined with fire brick or other insulating material, and the temperature is allowed to be high enough to reduce the NOX. Radiant heat is absorbed by the water/steam pipes 216, with water entering in accordance with arrow 244, and steam leaving in accordance with arrow 247. In general, the cross-section of the furnace is maintained in a rectangular form between the walls 280 and the floor and roof.

As shown in FIG. 4, there are two sets of conduits 247 for recycling of cool stack gases in accordance with lines 235 from blower 234. There are two vertical pipes 247 from which, by suitable nozzles or openings, the cooled stack gases are injected in accordance with arrows 237, into the hot products of combustion in the space 256.

The cooled gases from space 256 go into a second section, space 266, where they are reversed in direction, in accordance with arrow 264, and flow in a second direction, which is opposite to the first direction of the incoming fuel, air and NOX.

After the cooled stack gases are thoroughly mixed with the hot products of combustion from the reduction zone 214, secondary air 232 supplied by vertical pipes 292 is injected into the gas stream in accordance with arrows 236. This is supplied through overhead pipes and vertical pipes 292.

The injection of secondary air brings up the total air supply to a customary value of about 110% of stoichiometric value. There is, therefore, sufficient air now for complete combustion of all combustibles, which takes place in the reoxidation zone 282, 286. The combustion continues as the gases flow in accordance with arrow 276 through a second 180° bend, through the space 286, and into a water tube heat exchanger, for heat recovery from the products of combustion 276. In the heat recovery section 224 the water tubes 284 absorb heat from the gases and they leave in accordance with arrows 279 at a sufficiently low temperature, of about 300°, that they can be passed through the stack for emission to the atmosphere in accordance with arrows 245.

Part of the effluent gases 279, after cooling, are passed to a recycle blower 234 and by conduit shown by dashed line 235. These cooled stack gases are passed to the pipes 247 to supply the cooling gases 237 for cooling the output of the reduction section.

Because of the high temperature of the gases throughout the entire passage through the apparatus, all walls 280 of the structure are made of heat resisting material, such as is well-known in the art.

Because of the manner of introducing the cooled stack gases through the pipes 247 and the secondary air through the pipes 292, the cross-sections for flow of combustion gases are reduced, providing a more rapid mixing of the injected gases into the flow of combustion products. Also, the design illustrates that the injection of the cooling gases and the secondary air are from opposite sides into the continuing flow of hot gases.

FIG. 4 shows the outer wall 288 of the structure and the outlet conduit 287 from the heat exchanger including the water tubes 284.

FIG. 5 shows, in addition, the plenum 250 and the inlet pipes 228, 246 for the fuel and the NOX gases, and the inlet pipe for the primary air. In addition, it shows the steam chamber 290 having outlets 291, all of which are conventional. Also shown is the feed water entry 242, 243 and the pipe 244 to the furnace section. The pipe 244 as input to the steam pipes 216 can come from the boiler feed water 242, as in FIG. 5, or from the outlet 240 of the waste heat boiler 224 over dashed lines 244 of FIG. 3.

It will be clearly seen from examination of FIG. 3, in comparison with FIGS. 1 and 2, that, although they are not drawn to scale, it would require a much smaller floor space than either of FIG. 1 or FIG. 2.

While the invention has been described with a certain degree of particularity, it is manifest that many changes may be made in the details of construction and the arrangements of components without departing from the spirit and scope of the disclosure. It is understood that the invention is not limited to the embodiments set forth herein for purposes of exemplification, but is to be limited only by the scope of the attached claims, including the full range of equivalency to which each element or step thereof is entitled.

It is claimed:

1. A self-contained combination NOX disposal and heat recovery system characterized by:
   (a) a burner means and means to supply to said burner means
      NOX gases to be reduced, gaseous fuel at selected flow rate sufficient to maintain combustion, and primary air in less-than-stoichiometric flow rate;
   (b) a reducing section in which said NOX gases, primary air and fuel are burned after flowing through said burner means in a first direction;
   (c) water/steam tubes positioned in said reducing section to receive heat from the flame therein;
   (d) means to inject cooled stack gases into the hot products of combustion as they leave said reducing section into a furnace section downstream of said reducing section;
   (e) outlet means from said furnace section positioned such that the gases flowing out of said furnace section flow in a second direction opposite to said first direction;
   (f) means to inject secondary air into said gases flowing out of said furnace section; whereby the total of primary plus secondary air is greater-than-stoichiometric value;
   (g) a reoxidation section positioned to receive the flame and products of combustion flowing out of said furnace section in said second direction, and to output its products of reoxidation in said second direction to a heat recovery section; and
   (h) means to output cooled, NOX-reduced products of combustion from said heat recovery section to a stack means.

2. The system as in claim 1 including a reduction in cross-section for gas flow at point of injection of said cooled stack gases.

3. The system as in claim 1 including a reduction in cross-section for gas flow at the point of injection of said secondary air.

4. The apparatus as in claim 1 including means to conduct heated water/steam from the heat recovery section as the input to said water/steam tubes in said reducing section.

5. The system as in claim 2 including means to take cooled gaseous products of combustion at the outlet of said heat recovery section, and to inject said cooled gases under pressure at the outlet of said reducing section.

6. The system as in claim 4 including means to inject said cooled gases substantially perpendicular to said first direction from opposite sides of said gases flowing out of said reducing section.

7. The system as in claim 4 including means to inject said cooled gases substantially perpendicular to said first direction from opposite sides of said gases flowing out of said furnace section.

8. The apparatus as in claim 7 in which the outer diameter of said reducing and cooling sections are substantially equal.

9. The apparatus as in claim 7 in which the outer diameters of said reoxidation section and said boiler means are substantially equal.

10. The apparatus as in claim 7 in which said means to inject said cooled stack gases into said cooling section comprises axial tubular means extending from a wall at the downstream end of said means to reverse direction, and including radial ports through the wall of said axial tubular means.

11. A combination NOX disposal and heat recovery system, characterized by:
(a) A burner means and means to supply to said burner means with;
NOX gases to be reduced,
primary air in less-than-stoichiometric flow rate; and
a gaseous fuel at selected flow rate;
(b) a reducing section in which NOX gases, primary air and fuel are burned after flowing through said burner means, in a first direction;
(c) annular fire tube boiler means, surrounding said reducing section; the inner wall of said boiler means forming the outer wall of aid reducing section, whereby heat is transferred through said fire wall from said reducing section to said boiler;
(d) a cooling section downstream of said reducing section; and means to inject into said cooling section a selected flow rate of cooled stack gases;
(e) a reoxidation section surrounding said second cooling section with a common insulating wall therebetween; and means to reverse the direction of gas flow from said first direction in said reducing and cooling sections, to the opposite second direction in said reoxidation section;
(f) means to inject secondary air into the gas flowing out of said cooling section;
(g) means to conduct hot gases from said reoxidation section into the fire tubes of said annular boiler means to form said cooled stack gases; and
(h) means to conduct said cooled gases to a stack and/or to said cooling section.

12. A self-contained combination NOX disposal and heat recovery system, characterized by:
(a) a burner means and means to supply to said burner means;
NOX gases to be reduced,
gaseous fuel at selected flow rate sufficient to maintain combustion, and
primary air in less-than-stoichiometric flow rate;
(b) a reducing section in which said NOX gases, primary air and fuel are burned after flowing through said burner means in a first direction;
(c) water/steam tubes positioned in said reducing section to receive heat from the flame therein;
(d) means to inject cooled stack gases into the hot products of combustion as they leave said reducing section;
(e) a furnace section downstream of said reducing section, and outlet means from said furnace section positioned such that the gases flowing out of said section flow in a second direction opposite to said first direction;
(f) means to inject secondary air into said gases flowing out of said furnace section; whereby the total of primary plus secondary air is greater-than-stoichiometric value;
(g) a reoxidation section positioned to receive the flame and products of combustion flowing out of said furnace section in said second direction, and to output its products of reoxidation into heat exchange with said water/steam tubes to form said cooled stack gases.

* * * * *